May 23, 1944. C. E. BURT Re. 22,483
CEMENTING, WASHING, AND ACIDIZING RETAINER FOR OIL WELLS
Original Filed May 5, 1939
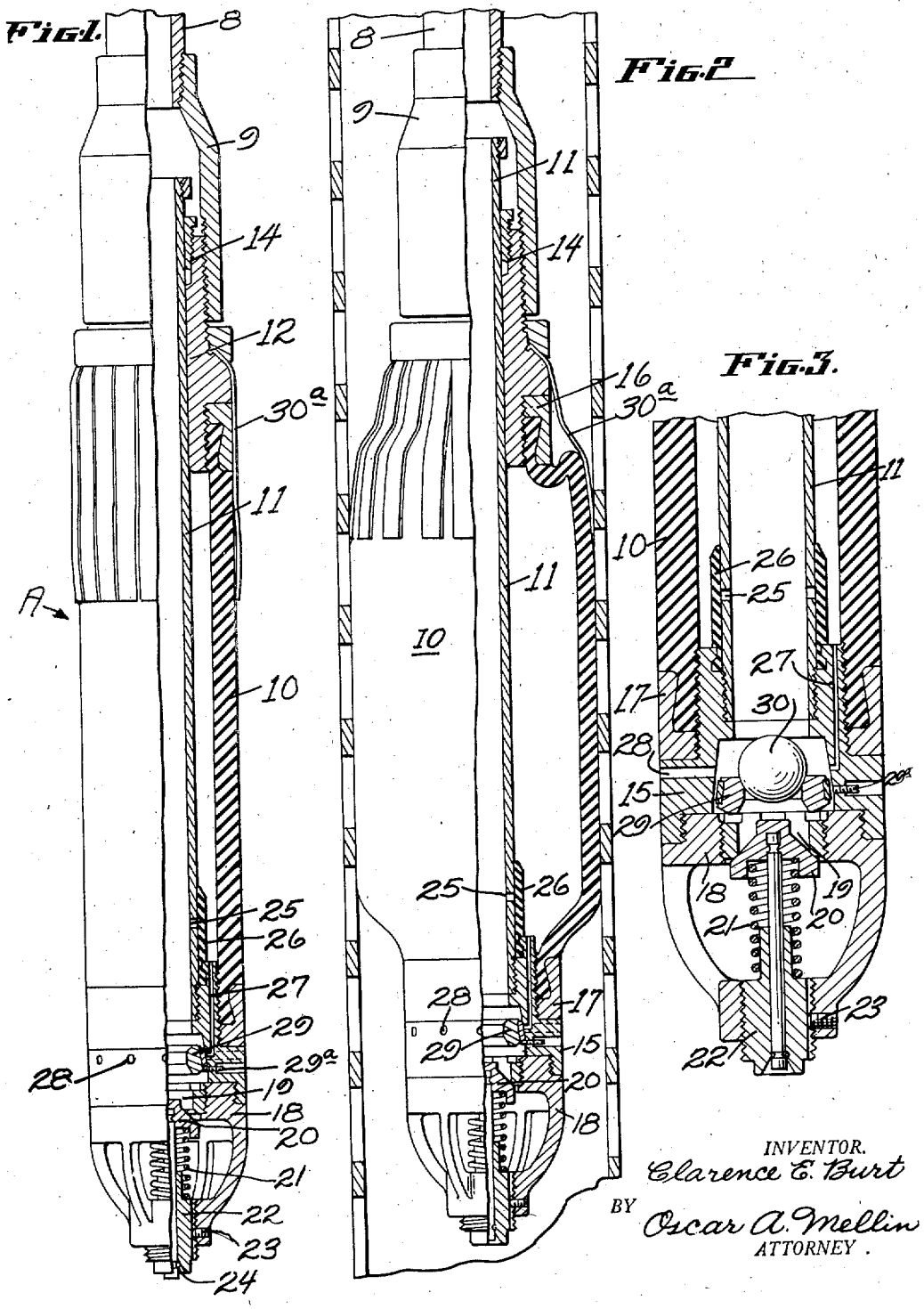

Reissued May 23, 1944 Re. 22,483

UNITED STATES PATENT OFFICE 22,483

CEMENTING, WASHING, AND ACIDIZING RETAINER FOR OIL WELLS

Clarence E. Burt, Altadena, Calif., assignor to Baker Oil Tools, Inc., Huntington Park, Calif., a corporation of California Original No. 2,196,658, dated April 9, 1940, Serial No. 271,938, May 5, 1939. Application for reissue April 5, 1941, Serial No. 387,048

13 Claims. (Cl. 166—1)

This invention relates generally to packers for oil wells and specifically to the type of packers known as retainers for cementing, washing and acidizing operations in a well bore.

It is the principal object of my present invention to provide an improved packer capable of efficient use in cementing, washing and acidizing operations in a well bore, either cased or uncased, which device may be set for operation at any desired point in a well bore by means of fluid pressure, and after it has performed its function, it may be readily retrieved or removed from the hole.

In practicing the invention, I provide a packer or retainer including an elongated, hollow, cylindrical packer body of rubber or like flexible material which is stationarily fixed at one end to a hollow mandrel and telescopically connected thereto at the opposite end. The packer is connected to the lower end of a string of running in tubing to enable the packer to be lowered into a well bore to the selected position. When this position is reached, the packer body may be expanded into packing relation to the casing or wall of the hole by pump pressure through the running in string. A cementing, washing or acidizing operation may then be carried on through the running in tubing and the packer. Thereafter the packer body may be collapsed so that it may be removed from the hole along with the running in string.

One form which the invention may assume is exemplified in the following description and illustrated by way of example in the accompanying drawing, in which:

Fig. 1 is a view partly in section and partly in elevation of a packer or retainer embodying the preferred form of my invention and shown in the condition which it assumes when it is run into the well bore.

Fig. 2 is a similar view showing the packer expanded in a well bore and ready for cementing, washing or acidizing operations.

Fig. 3 is a slightly enlarged fragmentary view showing the position of the parts thereof after the packer body has been collapsed for removal from the hole.

Referring more particularly to the accompanying drawing, A indicates a packer or retainer capable of use in cementing, washing, acidizing and other similar operations in a well bore. It should be pointed out here that this packer is capable of use in blank or perforated casing, or in open hole, as is desired, and operates with equal efficiency under either condition.

The packer or retainer A comprises a hollow tubular mandrel 11, the upper end of which is open and surrounded by a lock nut or head as illustrated. Surrounding this mandrel 11 in concentric relation thereto is a packer body 10 which is a hollow cylindrical body formed of rubber or like flexible material, so that the packer 10 is expansible but will retract to its normal condition due to its inherent resiliency. The packer body 10 may be of any desired length to suit the conditions under which the packer is to be operated.

The packer 10 is fixed to an upper head 12 by means of an upper clamping ring 16. The upper head 12 is telescopically mounted on the mandrel 11 and a gland structure 14 is provided to prevent leakage between the mandrel and the head 12. The head 12 is connected to a running in string of tubing 8 by means of a hollow sub 9. By this medium, the entire packer or retainer may be suspended from the running in string and run in the hole or pulled out of the hole as desired.

The lower end of the packer body 10 is secured to a lower head 15 by means of a lower clamping ring 17 as illustrated. Fixed to the lower head at its lower end is a valve body 18 having a concentric port 19 extending therethrough with a valve seat at its lower end and with which a back-pressure, poppet type valve 20 cooperates. The back-pressure valve 20 is fitted with a valve spring 21 which normally tends to maintain the valve seated upwardly against the seat of the valve port 19. It will be noticed that the portion of the valve body 18 below the valve port 19 is spider-like so that fluid discharging downwardly through the port 19 may discharge into the well bore below the packer or retainer.

It is desired, when running the packer into the hole, to maintain the back-pressure valve 20 open, and for this purpose the valve stem of the back-pressure valve 20 reciprocates in a guide 22 formed at the lower end of the spider-like portion of the valve body 18. This guide 22 is adjustable in the body 18 to adjust the tension of the valve spring 21, and to maintain it in proper adjustment, a set screw 23 is provided.

To maintain the back-pressure valve open against the action of the spring 21, when the packer or retainer is being run into a well bore, the stem of the valve 20 is provided with a circular groove near its lower end, and the bore of the valve stem guide 22 is slightly chamfered at its lower extremity to enable a ball latch 24 to be inserted therein, which will hold the valve 20 open while the packer or retainer is being run into the well bore. However, it is obvious that when circulation is started, that the valve 20 will move downwardly to some extent, allowing the ball 24 to drop out so that when the pressure is relieved, the spring 21 will be enabled to seat the valve.

It will be noticed that the packer body 10 is of a diameter somewhat greater than the mandrel 11 so as to provide a pressure chamber therebetween, the ends of which are defined by the head members 12 and 15. Between the head members, the mandrel 11 is formed with a series of inflating valve ports 25 and a sleeve type of inflating valve 26 is provided, which valve is formed of rubber so that when the pressure in the mandrel is greater than the pressure in the pressure chamber, the sleeve valve 26 will expand and allow fluid pressure to be built up in the pressure chamber through the ports 25, and thereby expand the packer body 10. However, the sleeve valve 26 prevents bleeding of the pressure chamber through the ports 25, should the pressure in the pressure chamber be greater than the pressure in the mandrel.

To deflate or contract the packer body 10, after it has been expanded into packing relation with the wall of the hole, or with the casing, bleeder ports 27 are provided in the lower head 15 which lead to the interior bore of the head 15. Leading from this interior bore of the head 15 outwardly through the head, are bleeder ports 28. Both sets of these ports are covered at the interior bore of the head 15 by means of a bleeder valve ring 29 normally held in position obstructing these ports by means of a shear pin 29*a*.

When it is desired to render the bleeder ports 27 and 28 effective, a trip ball 30 is dropped down the running in string of tubing and lands on the ring-like bleeder valve 29, and the pressure built up behind the ball 30 shears the shear pin 29*a* and shifts the bleeder valve ring to open position, uncovering the ports 27 and 28 to establish communication between the pressure chamber and the space surrounding the exterior of the packer. Thus, the fluid pressure in the packer will be bled, collapsing the same and enabling the entire device to be removed from the well bore.

To protect the upper end of the packer body 10 when it is being removed from the hole, and for other purposes, I provide a series of flat spring arms 30*a*. The upper ends of these spring arms 30*a* are attached to the head 12 and depend downwardly, there being a considerable number of these arms to form a shield as illustrated. However, when the packer expands, the free ends of these arms are moved outwardly as illustrated in Fig. 2, due to their connection with the head 12 and due to their inherent flexibility.

In operation of the device, it is constructed and assembled as shown in the drawing and is connected to the lower end of a string of running in tubing 8. At this time the valve 20 is held slightly open to allow the by-pass of fluid upwardly through the device, while it is being run into the well bore. When the device has reached the point of operation, the pumps are commenced and pressure is built up which immediately causes the valve 20 to move downwardly sufficiently to enable the ball 24 to drop out and unlatch the valve 20, so that the same may seat. As this pressure is continued, fluid pressure is built up in the pressure chamber, causing expansion of the packer body 10 into packing relation with the casing or bore as the case may be. The distention or foreshortening of the packer body may be accomplished due to the telescopic connection between the head 12 and the mandrel 11.

After the packer body has been expanded by fluid pressure, the desired operation may be performed through the packer. That is to say, washing fluid may be pumped downwardly through the running in string 8, the hollow mandrel 11, opening the valve 20 and discharging into the bore below the packer. This fluid may discharge outwardly through the screen casing and upwardly around the same to wash it. Of course, that portion of the screen casing covered by the packer body 10 will be blanked off thereby. If a cementing operation is desired, cement slurry may be pumped downwardly through the device in a similar manner and into the well bore below the packer, the back-pressure valve and the packer body preventing it from passing upwardly past the packer. In a similar manner, an acidizing operation may be conducted.

After the operation has been performed, and it is desired to remove the packer from the hole, the trip ball 30 is dropped downwardly through the running in string and through the mandrel 11 until it seats on the bleeder valve ring 29. Pump pressure then built up in the mandrel 11 will be exerted against the ball sufficiently to shear the pin 29*a*, shifting the bleeder valve to an open position uncovering the bleeder ports 27 and 28. The fluid pressure in the pressure chamber may then bleed through the ports 27 and 28, causing collapsing of the packer body 10. The running in string may then be pulled from the hole, retrieving the entire packer or retainer A.

From the foregoing it is obvious that I have provided a very simple and efficient device for carrying on cementing, washing, acidizing and analogous operations in a well bore, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An apparatus of the character described comprising an axially contractible and extensible body structure having an annular head member and a tubular body member depending from said head member and having a fluid-tight telescopic sliding engagement in the bore thereof, and a tubular expansible packer body surrounding said depending tubular body member and connected at its opposite respective ends to said head member and to said depending tubular body member.

2. An apparatus of the character described comprising a tubular mandrel having an open upper end, back-pressure valve means controlling the lower end of said mandrel, a tubular expansible packer body surrounding the mandrel and fixed thereto at its lower end, a telescopic connection between the upper end of the packer body and the mandrel, said connection preventing the by-pass of fluid between the mandrel and the packer body, and valve controlled ports in the mandrel to enable fluid pressure built up in the mandrel to be exerted between the mandrel and the packer body to expand the latter.

3. An apparatus of the character described comprising an axially contractible and extensible body structure having an annular head member and a tubular mandrel depending from said head member and having a fluid-tight telescopic sliding engagement in the bore thereof, and a tubular extensible packer body surrounding said depending tubular mandrel and connected to its opposite respective ends to said head member and to said depending tubular mandrel, said mandrel having ports formed therein at a point between the ends of the packer body to enable fluid pressure built up in the mandrel to be exerted between the mandrel and the packer body to expand the latter.

4. An apparatus of the character described comprising an axially contractible and extensible body structure having an annular head member and a tubular mandrel depending from said head member and having a fluid-tight telescopic sliding engagement in the bore thereof, a tubular expansible packer body surrounding said depending tubular mandrel and connected at its opposite respective ends to said head member and to said depending tubular mandrel, said mandrel having ports formed therein at a point between the ends of the packer body to enable fluid pressure built up in the mandrel to be exerted between the mandrel and the packer body to expand the latter, and check-valve means controlling said ports to prevent reduction of pressure between the mandrel and packer body through said ports.

5. An apparatus of the character described comprising an axially contractible and extensible body structure having an annular head member and a tubular mandrel depending from said head member and having a fluid-tight telescopic sliding engagement in the bore thereof, and a tubular expansible packer body surrounding said depending tubular mandrel and connected at its opposite respective ends to said head member and to said depending tubular mandrel, a back-pressure valve controlling the lower end of said mandrel, and check-valve means controlling said ports to prevent the reduction of pressure between the mandrel and said packer body through said ports.

6. An apparatus of the character described comprising a body structure having an upper annular head member and a tubular mandrel depending from said head member and having at its lower end a lower annular head member, the upper portion of said mandrel having a fluid-tight telescopic sliding engagement in the bore of said upper head member, a back-pressure valve carried by the lower head member to control flow of fluid through said mandrel, and a tubular expansible packer body surrounding the depending mandrel and connected at its respective opposite ends to said upper and lower head members, said mandrel having ports formed therein intermediate said head members to enable pressure built up in the mandrel to be exerted between the mandrel and said packer body to expand the latter.

7. An apparatus of the character described comprising a body structure having an upper annular head member and a tubular mandrel depending from said head member and having at its lower end a lower annular head member, the upper portion of said mandrel having a fluid-tight telescopic sliding engagement in the bore of said upper head member, a back-pressure valve carried by the lower head member to control flow of fluid through said mandrel, a tubular expansible packer body surrounding the depending mandrel and connected at its respective opposite ends to said upper and lower head members, said mandrel having ports formed therein intermediate said head members to enable pressure built up in the mandrel to be exerted between the mandrel and said packer body to expand the latter, and valve means controlling said ports to prevent the flow of fluid from between the mandrel and said packer body back into said mandrel.

8. An apparatus of the character described comprising a tubular mandrel having an open upper end, a lower head member fixed to the lower end of the mandrel, a back-pressure valve carried by the lower head member to control the flow of fluid through the lower end of the mandrel, an upper head member telescopically mounted on the mandrel in fluid-tight relationship thereto, a tubular packer body mounted concentrically about the mandrel and secured at its lower end to the lower head member and at its upper end to the upper head member, means for connecting the upper head member to a string of running in tubing, said mandrel having ports formed therein intermediate said head members to enable fluid pressure built up in the mandrel to be exerted between the mandrel and said packer body to expand the latter, said lower head member having bleeder ports formed therein to bleed the fluid pressure from between the space intermediate the mandrel and the packer body, bleeder valve means normally closing said ports, and means for operating said bleeder valve means after the device has been positioned in a well bore to open said bleeder ports.

9. An apparatus of the character described comprising a tubular mandrel having an open upper end, a lower head member fixed to the lower end of said mandrel, a back-pressure valve carried by the lower head member for controlling the flow of fluid into the lower end of said mandrel, an upper head member telescopically mounted on the mandrel adjacent its upper end, a tubular packer body secured at opposite ends to said head members and surrounding said mandrel and of a diameter greater than said mandrel to provide a pressure chamber therebetween, said mandrel being formed with ports in register with said pressure chamber, valve means controlling said ports and opening only when the pressure in the mandrel is greater than the pressure in the pressure chamber, said lower head member being formed with bleeder ports communicating with the pressure chamber and with the well bore exteriorly of said lower head member, bleeder valve means normally in closed position and closing said ports, means for operating said bleeder valve means after the apparatus has been lowered in a well bore for moving said bleeder valve means to open position unobstructing said ports to enable collapsing of the packer body, and means for connecting the upper head member to a string of running in tubing.

10. An apparatus of the character described comprising a tubular mandrel having an open upper end, a lower head member fixed to the lower end of said mandrel, a back-pressure valve carried by the lower head member for controlling the flow of fluid into the lower end of said mandrel, an upper head member telescopically mounted on the mandrel adjacent its upper end, a tubular packer body secured at opposite ends to said head members and surrounding said mandrel and of a diameter greater than said mandrel to provide a pressure-chamber therebetween, said mandrel being formed with ports in register with said pressure chamber, valve means controlling said ports and opening only when the pressure in the mandrel is greater than the pressure in the pressure chamber, said lower head member being formed with bleeder ports communicating with the pressure chamber and with the well bore exteriorly of said lower head member, bleeder valve means normally in closed position and closing said ports, means for connecting the upper head member to a string of running in tubing, a ball valve member adapted to be dropped down the running in string of tubing and through the mandrel and to engage said bleeder valve means to move the same to open position.

11. A device of the character described comprising a tubular member having an open upper end, a lower head member connected to the lower end of said tubular member, back-pressure valve means carried by the lower head member to control the flow of fluid into the lower end of said tubular member, an upper head member slidably mounted on the tubular member, means for connecting the upper head member to a string of running in tubing, a tubular expansible packer body connected at its opposite ends to said head members and surrounding the same and capable of expansion by fluid pressure built up in the tubular member, and a series of flexible members secured to the upper head member and depending downwardly a distance over the upper end of the tubular packer body and capable of expanding and contracting therewith.

12. A device of the character described comprising a tubular member having an open upper end, a lower head member connected to the lower end of said tubular member, back-pressure valve means carried by the lower head member to control the flow of fluid into the lower end of said tubular member, an upper head member slidably mounted on the tubular member, means for connecting the upper head member to a string of running in tubing, a tubular expansible packer body connected at its opposite ends to said head members and surrounding the same and capable of expansion by fluid pressure built up in the tubular member, a series of flexible members secured to the upper head member and depending downwardly a distance over the upper end of the tubular packer body and capable of expanding and contracting therewith, valve controlled means enabling fluid pressure to be built up between the tubular member and the packer body from within the tubular member, and valve controlled means for enabling reduction of the pressure between the tubular member and the packer body.

13. Apparatus adapted for use in holes in the earth, to force cement slurry or other sealing fluid into earth formations, including a tubular member adapted to be lowered into said hole for delivering sealing fluid into the same, a packer mounted on said tubular member, said packer being designed to expand and contact the wall of the hole and effect a seal therewith under the influence of fluid pressure exerted internally thereof, means providing an outlet for said tubular member adjacent said packer, valve means controlling the flow of fluid from said tubular member through said outlet means, means for urging said valve means to closed position to enable fluid pressure to be built up on the inside of said packer in excess of that on the outside thereof for expanding said packer into sealing engagement with the wall of the hole, said urging means exerting sufficient force to maintain the valve means closed unless the pressure within said tubular member exceeds that externally of the packer by an amount which is greater than the aforementioned excess and means for temporarily retaining said valve means in open position, said last named means being rendered inoperative by the first downward surge of fluid through the tubular member.

CLARENCE E. BURT.